(12) United States Patent (10) Patent No.: US 7,617,400 B2
Zimmer et al. (45) Date of Patent: Nov. 10, 2009

(54) STORAGE PARTITIONING

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 11/071,663

(22) Filed: Mar. 2, 2005

(65) Prior Publication Data

US 2006/0200858 A1 Sep. 7, 2006

(51) Int. Cl.
*G06F 21/00* (2006.01)
*H04L 12/22* (2006.01)

(52) U.S. Cl. ........................................ 713/190; 711/215
(58) Field of Classification Search .................... 711/6, 711/173, 202, 205–207, 209, 215, 221; 713/190, 713/193–194
See application file for complete search history.

(56) References Cited

U.S. PATENT DOCUMENTS

| | | | |
|---|---|---|---|
| 6,665,786 B2 * | 12/2003 | McMichael et al. | 711/173 |
| 2003/0149854 A1 * | 8/2003 | Yoshino et al. | 711/173 |
| 2004/0088513 A1 * | 5/2004 | Biessener et al. | 711/173 |
| 2004/0215688 A1 * | 10/2004 | Frank et al. | 709/200 |

OTHER PUBLICATIONS

Microsoft., Virtual Machine Architecture, http://msdn.microsoft.com., Microsoft Virtual Server 2005 COM Interface, 2 pages.
Microsoft., IVM Virtual Machine, http://msdn.microsoft.com, Microsoft Virtual Server 2005 COM Interface, 10 pages.
Microsoft., Virtual Server Architecture, http://msdn.microsoft.com, Microsoft Virtual Server 2005 COM Interface, 2 pages.
Microsoft., Microsoft Virtual Server 2005 COM Interface, http://msdn.microsoft.com, 2 pages.
Microsoft., Virtual Server Features, http://msdn.microsoft.com, Virtual Server Features, Microsoft Virtual Server 2005 COM Interface, 3 pages.
Microsoft., Virtual Machine Emulated Hardware, http://msdn.microsoft.com, Microsoft Virtual Server 2005 COM Interface, 4 pages.

* cited by examiner

*Primary Examiner*—Gilberto Barron, Jr.
*Assistant Examiner*—Venkat Perungavoor
(74) *Attorney, Agent, or Firm*—Blakely, Sokoloff, Taylor & Zafman LLP

(57) ABSTRACT

In one embodiment, a method is provided that may include one or more operations. One of these operations may include partitioning, in response at least in part to a request from a remote authority, at least a portion of storage into partitions. The partitions may be in accordance, at least in part, with partitioning information from the remote authority. The partitioning information may associate sessions with the partitions. Many modifications, variations, and alternatives are possible without departing from this embodiment.

10 Claims, 2 Drawing Sheets

STORAGE PARTITIONING

FIELD

The subject application is related to the field of storage partitioning.

BACKGROUND

In a typical corporate information technology and/or computing arrangement, a host owned by a corporation may be assigned to one or more employees of the corporation for use by the employees in carrying out the employees' work for the corporation. In this typical arrangement, the host executes a virtual machine operating system that comprises a virtual machine monitor and permits the host to execute a plurality of virtual machine sessions. The host includes mass storage, and the virtual machine monitor assigns to the sessions respective portions of the mass storage to be used by the sessions. The virtual machine monitor maintains configuration data in the host's system memory that identifies the respective assignments of these portions of the mass storage to the sessions. The sessions access their respective assigned portions of the mass storage by issuing storage access requests to the virtual machine monitor, which then issues appropriate commands to the mass storage.

In this typical arrangement, after the corporation initially has assigned the respective portions of the mass storage to the sessions, employees in possession of the host and/or software executed by the host may issue commands to the virtual machine monitor and/or to the host system memory that may result in unauthorized modification of configuration data maintained by the virtual machine monitor. This may result in unauthorized change of the assignments of the portions of the mass storage to the sessions, and/or may render inaccessible the data stored in these portions of the mass storage.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
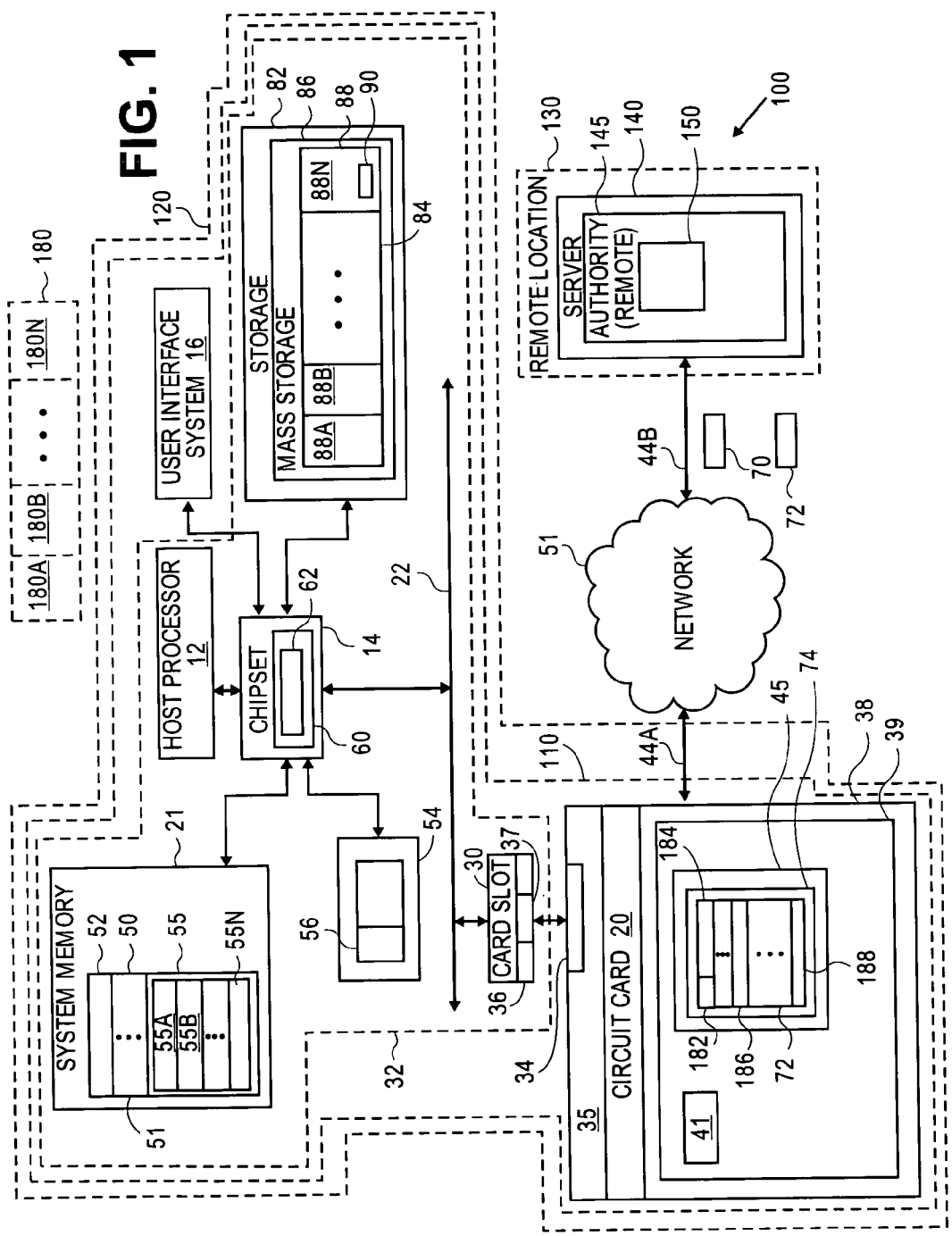
FIG. 1 illustrates a system embodiment.

FIG. 1 illustrates a system embodiment 100. System 100 may comprise host 110. As used herein, a "host" means a system that comprises at least a processor and memory. As used herein, a "processor" means circuitry capable of executing one or more logical and/or Boolean operations. Host 110 may be geographically located at a first location 120. Host 110 may comprise a host processor 12 coupled to a chipset 14. Host processor 12 may comprise, for example, one or more Intel® Pentium® IV and/or Itanium® microprocessors that are commercially available from the Assignee of the subject application. Of course, alternatively, host processor 12 may comprise one or more other types of microprocessors, such as, for example, one or more microprocessors that are manufactured and/or commercially available from a source other than the Assignee of the subject application, without departing from this embodiment.

Host 110 also may comprise, for example, user interface system 16, bus system 22, circuit card slot 30, system memory 21, chipset 14, memory 54, storage 82, and circuit card 20. Chipset 14 may comprise a bridge/hub system that may couple host processor 12, system memory 21, and user interface system 16 to each other. Chipset 14 may also include an input/output (I/O) bridge/hub system (not shown) that may couple the host bridge/bus system, storage 82, and memory 54 to bus 22. Chipset 14 may comprise one or more integrated circuit chips, such as those selected from integrated circuit chipsets commercially available from the Assignee of the subject application (e.g., graphics memory and I/O controller hub chipsets), although one or more other integrated circuit chips may also, or alternatively be used, without departing from this embodiment. Additionally or alternatively, chipset 14 may comprise an integrated circuit 60 that may comprise storage controller 62 that may be capable of controlling and/or monitoring, at least in part, the operation of storage 82. User interface system 16 may comprise, e.g., a keyboard, pointing device, and display system that may permit a human user to input commands to, and monitor the operation of, system 100.

Memory 54 and memory 21 each may comprise one or more of the following types of machine-readable memories: semiconductor firmware memory, programmable memory, non-volatile memory, read only memory, electrically programmable memory, random access memory, flash memory, magnetic disk memory, and/or optical disk memory. Either additionally or alternatively, memory 54 and/or memory 21 may comprise other and/or later-developed types of computer-readable memory.

Bus 22 may comprise a bus that complies and/or is compatible with the Peripheral Component Interconnect (PCI) Express™ Base Specification Revision 1.0, published Jul. 22, 2002, available from the PCI Special Interest Group, Portland, Oreg., U.S.A., and/or later-developed version of said Specification (hereinafter collectively or singly referred to as a "PCI Express™ bus"). Alternatively, bus 22 may comprise other types and configurations of bus systems, without departing from this embodiment.

Storage 82 may comprise mass storage 86. At least a portion 84 of mass storage 86 may comprise a plurality of partitions 88. For example, in this embodiment, partitions 88 may comprise partitions 88A, 88B, . . . 88N. As used in this embodiment, a "portion" of an entity may comprise some or all of the entity. Storage 82 may comprise one or more storage devices. Likewise, mass storage 86 may comprise one or more mass storage devices. Portion 84 may comprise one or more mass storage devices that may be comprised in mass storage 86. In this embodiment, each of the partitions 88A, 88B . . . 88N may comprise one or more respective portions of one or more mass storage devices comprised in portion 84. Additionally or alternatively, in this embodiment, one or more of the partitions 88A, 88B . . . 88N may span a plurality of mass storage devices comprised in portion 84.

As used herein, the terms "storage" and "storage device" may be used interchangeably to mean one or more apparatus into, and/or from which, data and/or commands may be stored and retrieved, respectively. Also, as used herein, the terms "mass storage" and "mass storage device" may be used interchangeably to mean one or more storage devices capable of non-volatile storage of data and/or commands, and, for example, may include, without limitation, one or more magnetic, optical, and/or semiconductor storage devices, such as, for example, in this embodiment, one or more disk storage devices. Additionally, as used herein, a "partition" means one or more portions of one or more logical, physical, and/or virtual storage devices.

Circuit card slot 30 may comprise, for example, a PCI Express™ compatible or compliant expansion slot or interface 36. Interface 36 may comprise a bus connector 37 that may be electrically and mechanically mated with a mating bus connector 34 that may be comprised in a bus expansion slot or interface 35 in circuit card 20.

As used herein, "circuitry" may comprise, for example, singly or in any combination, analog circuitry, digital circuitry, logic circuitry, hardwired circuitry, programmable circuitry, state machine circuitry, and/or memory that may comprise machine-executable instructions that may be executed by programmable circuitry. Also as used herein, an "integrated circuit" means one or more semiconductor devices and/or one or more microelectronic devices, such as, for example, a semiconductor integrated circuit chip. In this embodiment, circuit card 20 may comprise operative circuitry 38. Operative circuitry 38 may comprise, for example, integrated circuit 39. Integrated circuit 39 may comprise microcontroller 41 and memory 45. Microcontroller 41 may comprise one or more processors (not shown).

Memory 45 may comprise one or more of the following types of machine-readable memories: semiconductor firmware memory, programmable memory, non-volatile memory, read only memory, electrically programmable memory, random access memory, flash memory, magnetic disk memory, and/or optical disk memory. Either additionally or alternatively, memory 45 may comprise other and/or later-developed types of computer-readable memory.

Machine-executable instructions may be stored in memory 45. These instructions may be accessed and executed by operative circuitry 38, integrated circuit 39, and/or microcontroller 41. When so executed, these instructions may result in card 20, circuitry 38, integrated circuit 39, and/or microcontroller 41 performing the operations described herein as being performed by card 20, circuitry 38, integrated circuit 39, and/or microcontroller 41.

Slot 30 and card 20 may be constructed to permit card 20 to be inserted into slot 30. When card 20 is properly inserted into slot 30, connectors 34 and 37 may become electrically and mechanically coupled to each other. When connectors 34 and 37 are so coupled to each other, circuitry 38 may become electrically coupled to bus 22.

Alternatively, some or all of operative circuitry 38, integrated circuit 39, memory 45, and/or microcontroller 41 may not be comprised in card 20, but instead, may be comprised in one or more other structures, systems, and/or devices that may be, for example, comprised in motherboard 32, coupled to bus 22, and exchange data and/or commands with other components (such as, for example, chipset 14, integrated circuit 60, controller 62, network 51, server 140, remote authority 145, one or more agents 150, and/or other and/or additional components) in system 100. For example, in this alternative, some or all of operative circuitry 38, integrated circuit 39, memory 45, and/or microcontroller 41 may be comprised in one or more integrated circuits that may be comprised in chipset 14 and coupled to server 140 via network 51. Also alternatively, some or all of operative circuitry 38, integrated circuit 39, memory 45, and/or microcontroller 41 may not be comprised in chipset 14, but may be comprised in motherboard 32 and coupled to server 140 via network 51. Also alternatively, some or all of memory 54 may be comprised in card 20, circuitry 38, and/or integrated circuit 39 instead of being comprised in system motherboard 32. Many alternatives, modifications, and variations are possible.

Processor 12, system memory 21, chipset 14, bus 22, circuit card slot 30, and memory 54 may be comprised in a single circuit board, such as, for example, system motherboard 32. Storage 82 may be mounted to motherboard 32, or alternatively, may not be mounted to motherboard 32, without departing from this embodiment. The number of storage devices, mass storage devices, and/or partitions 88 comprised in storage 82 may vary without departing from this embodiment.

Chipset 14, controller 62, and/or integrated circuit 60 may exchange data and/or commands with storage 82 in accordance with one or more of a variety of different communication protocols, e.g., a Small Computer Systems Interface (SCSI), Fibre Channel (FC), Ethernet, Serial Advanced Technology Attachment (S-ATA), and/or Transmission Control Protocol/Internet Protocol (TCP/IP) communication protocol. Of course, alternatively and/or additionally, chipset 14, controller 62, and/or integrated circuit 60 may exchange data and/or commands with storage 82 in accordance with other and/or additional communication protocols, without departing from this embodiment.

In accordance with this embodiment, the SCSI protocol in accordance with which chipset 14, controller 62, and/or integrated circuit 60 may exchange data and/or commands with storage 82 may comply or be compatible with the protocol described in American National Standards Institute (ANSI) Small Computer Systems Interface-2 (SCSI-2) ANSI X3.131-1994 Specification. If chipset 14, controller 62, and/or integrated circuit 60 exchange data and/or commands with storage 82 in accordance with an FC protocol, the FC protocol may comply or be compatible with the protocol described in ANSI Standard Fibre Channel (FC) Physical and Signaling Interface-3 X3.303:1998 Specification. If chipset 14, controller 62, and/or integrated circuit 60 exchange data and/or commands with storage 82 in accordance with an Ethernet protocol, the Ethernet protocol may comply or be compatible with the protocol described in Institute of Electrical and Electronics Engineers, Inc. (IEEE) Std 802.3, 2000 Edition, published on Oct. 20, 2000. If chipset 14, controller 62, and/or integrated circuit 60 exchange data and/or commands with storage 82 in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group. Also, if chipset 14, controller 62, and/or integrated circuit 60 may exchange data and/or commands with storage 82 in accordance with TCP/IP, the TCP/IP may comply or be compatible with the protocols described in Internet Engineering Task Force (IETF) Request For Comments (RFC) 791 and 793, published September 1981.

In this embodiment, circuitry 38 may be coupled, via one or more network communication links 44A, to communication network 51. Additionally, system embodiment 100 may comprise server 140. Server 140 may be coupled, via one or more network communication links 44B, to communication network 51. Circuitry 38 may be capable of exchanging data and/or commands via one or more links 44A, network 51, and one or more links 44B in accordance with one or more of a variety of different communication protocols, e.g., Ethernet and/or TCP/IP communication protocols.

Server 140 may comprise a remote authority (e.g., a remote management authority) 145. Server 140 may be located at a location 130 that is geographically remote from the location 120 of host 110. Remote authority 145 may comprise one or more program processes including one or more agents 150 that may implement and/or carry out one or more management and/or authorization functions described herein. For example, in this embodiment, server 140 may comprise one or more processors (not shown) that may be capable of executing one or more machine-executable instructions that may result in the spawning and maintaining of agents 150 in server 140.

Figure 2:
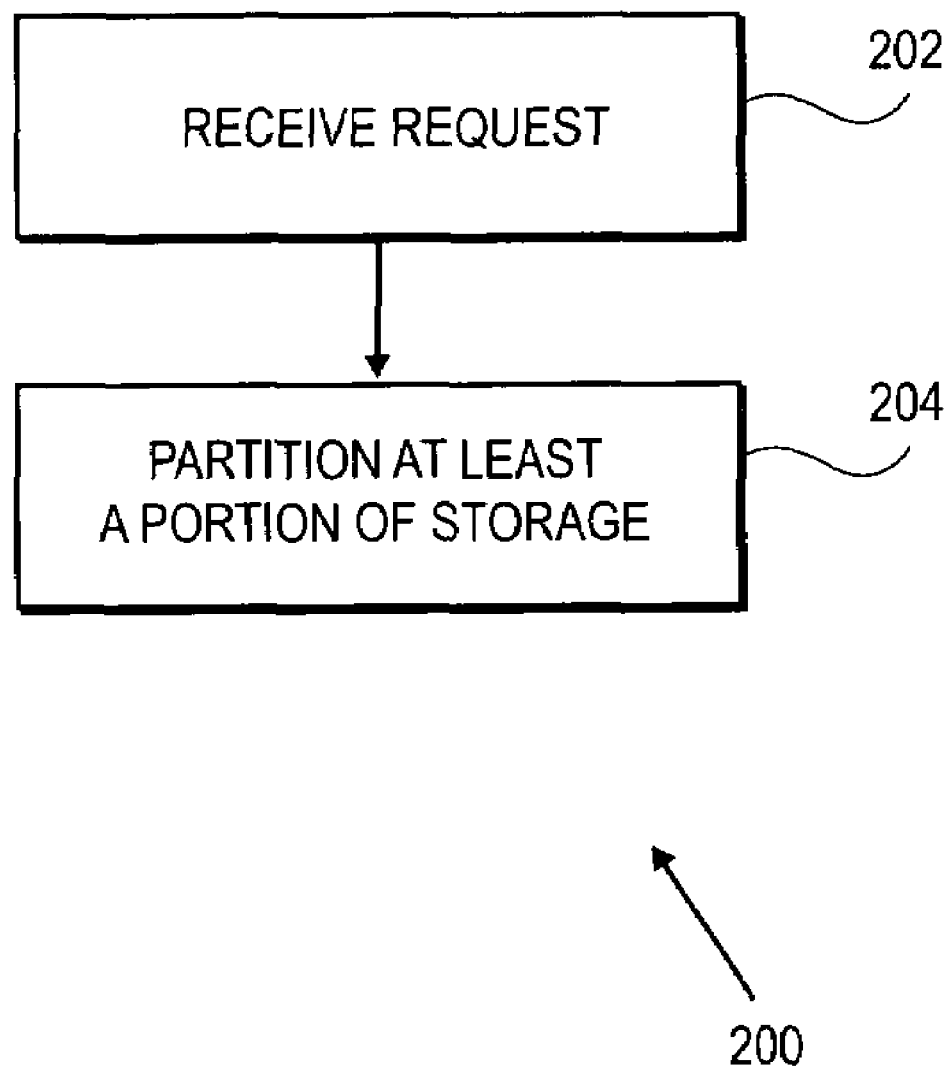
FIG. 2 is a flowchart that illustrates operations that may be performed according to an embodiment.

With reference now being made to FIG. 2, operations 200 that may be carried out in system 100 according to an embodiment will be described. After, for example, a reset of host 110, host processor 12 may boot an operating system by executing operating system instructions that may result, at least in part, in one or more operating systems 50 being loaded, at least in part, into memory 21. One or more operating systems 50 may comprise one or more operating system processes and/or objects 51. Without departing from this embodiment, one or more operating systems 50 may comprise, for example, a plurality of operating systems, such as, Linux and/or Windows™ Virtual Server operating systems.

One or more operating system processes and/or objects 51 may comprise one or more virtual machine manager processes 52 and one or more virtual machine sessions 55. Sessions 55 may comprise, for example, a plurality of virtual machine sessions 55A ... 55N. Of course, the number and/or type of operating system objects, processes, and/or sessions that may be comprised in operating system 50, one or more processes and/or objects 51, one or more virtual machine monitor processes 52, sessions 55, and/or sessions 55A ... 55N may vary without departing from this embodiment.

As used herein, a "process" may, but is not required to comprise, one or more instructions and/or data that when executed, accessed, and/or manipulated by a processor may result in performance of one or more operations by the processor. Likewise, as used herein, an "object" may, but is not required to comprise, one or more instructions and/or data that when executed, accessed, and/or manipulated by a processor may result in performance of one or more operations by the processor. Additionally, as used herein, a "session" means one or more processes and/or one or more objects that may be used to facilitate, embody, implement, represent, emulate, and/or simulate, at least in part, one or more virtual and/or logical computing systems and/or environments. Also, as used herein, the terms "virtual machine monitor" and "virtual machine monitoring process" may be used interchangeably to mean one or more processes and/or one or more objects that may be used to monitor, manage, and/or control operation, at least in part, and/or may facilitate the monitoring, managing, and/or control of the operation, at least in part, of one or more sessions.

After the reset of host 110, but prior to the booting of the one or more operating systems 50, executing of the one or more operating systems' instructions, and/or loading of the one or more operating systems 50 into system memory 21, microcontroller 41 may execute one or more basic input/output system (BIOS) instructions 56 that may be stored in memory 54. In this embodiment, the execution of these BIOS instructions 56 by microcontroller 41 may result, at least in part, in microcontroller 41 and/or circuitry 38 storing data structure 74 in memory 45. More specifically, after the reset of host 110, but prior to the booting of the one or more operating systems 50, executing of the one or more operating systems' instructions, and/or loading of the one or more operating systems 50 into memory 21, authority 145 and/or one or more processes 150 may generate and issue to circuitry 38 via one or more links 44B, network 51, and one or more links 44A, partition request 70 and partitioning information 72.

Thereafter, as illustrated by operation 202 in FIG. 2, circuitry 38 may receive request 70. In this embodiment, request 70 may be, comprise, be associated with, and/or be accompanied by partitioning information 72. Partitioning information 72 may associate sessions 55 with partitions 88. As is discussed more fully below, as illustrated by operation 204, in response, at least in part to request 70, circuitry 38 and/or microcontroller 41 may partition, in accordance at least in part with partitioning information 72, at least portion 84 of storage 82 into partitions 88.

For example, as part of operation 204, in response at least in part to execution of instructions 56 by microcontroller 41 and/or receipt by microcontroller 41 of request 70 and/or information 72, may signal memory 45. This may result in memory 45 storing data structure 74. As used herein, a "data structure" may, but is not required to comprise a plurality of types of data. In this embodiment, data structure 74 may comprise information 72.

Among the information that may be included in partition information 72, partition information 72 may include one or more partition listings 182, one or more session listings 184, logical and/or physical addresses 186 of bus 22, and logical and/or physical addresses 188 of partitions 88 in storage 82. Listings 182 and 184 and addresses 186 and 188 may be mutually associated with each other (e.g., in the form of a look up table in data structure 74) so as to map and/or associate partitions 88, addresses 188 of partitions 88 in storage 82, and sessions 55 with virtual storage devices 180 and addresses 186 of bus 22 via which devices 180 may be accessed. In this embodiment, addresses 186 may comprise respective sets and/or ranges of addresses of bus 22 that may be associated with virtual storage devices 180A ... 180N via which each of the partitions 88A ... 88N may be accessed by respective of the sessions 55A ... 55N, and addresses 188 may comprise respective sets and/or ranges of addresses of respective of the partitions 88A ... 88N in storage 82. Of course, the number and type of addresses 186, addresses 188, and/or devices 180 may vary without departing from this embodiment. Additionally, the type of information that may be included in partition information 72 and/or data structure 74 may vary without departing from this embodiment.

Also as part of operation 204, the execution of instructions 56 by microcontroller 41 may result in microcontroller 41 and/or circuitry 38 signaling chipset 14, integrated circuit 60, and/or controller 62. This may result in controller 62 operating, in the manner described hereinafter, in response to one or more requests from one or more of the sessions 55 directed to one or more of the virtual devices 180 and/or one or more of the addresses 186.

After the loading of one or more operating systems 50 into system memory 21, the execution of instructions 56 by microcontroller 41 may result in microcontroller 41 signaling sessions 55A ... 55N. This may result in sessions 55A ... 55N being provided with information from microcontroller 41 that may indicate respective assignments of respective virtual storage devices 180A ... 180N to respective sessions 55A ... 55N, and respective sets and/or ranges of addresses 186 via which the respective sessions 55A ... 55N may access devices 180A ... 180N. These assignments of devices 180A ... 180N to sessions 55A ... 55N, and the respective sets and/or ranges of addresses 186 via which the respective sessions 55A ... 55N may access devices 180A ... 180N may correspond, at least in part, to the association among the devices 180, sessions 55, and addresses 186 embodied in the information 72. As used herein, "accessing" data may, but is not required to comprise, reading and/or writing data. Also as used herein, a "set" or "range" of addresses may comprise and/or be specified by one or more addresses.

Thereafter, one or more of the sessions (e.g., session 55N) may issue to chipset 14, integrated circuit 60, and/or controller 62 a request to access (e.g., read) data (e.g., data 90) that, at least from the vantage point of session 55N is stored in one of the virtual storage devices (e.g., virtual storage device 180N) that was assigned to session 55N. This request may be directed to accessing data at one or more of the addresses in a set and/or range of addresses 186 via which the virtual storage device 180N may be accessed.

In response, at least in part, to this request, controller 62 may redirect the request to circuitry 38 and/or microcontroller 41. In response, at least in part, to the redirected request, the execution of instructions 56 by microcontroller 41 may result in microcontroller 41 determining, based at least in part upon information 72, the partition (e.g., partition 88N) in storage 82 that has been assigned to the session 55N that issued the data access request, and one or more sets and/or ranges of addresses 188 that may correspond to and/or be associated with the set and/or range of addresses 186 to which the data access request issued by session 55N was directed. For example, based at least in part upon the information 72, microcontroller 41 may translate one or more sets and/or ranges of the addresses 186 to which the data access request issued by session 55N was directed into one or more corresponding sets and/or ranges of addresses 188 in partition 88N in storage 82. In this example, these one or more corresponding sets and/or ranges of addresses may address, indicate, and/or specify, at least in part, partition 88N and/or data 90 stored in partition 88N.

After microcontroller 41 has performed this translation, microcontroller 41 may signal controller 62. This may result controller 62 reading the data 90 from partition 88N, and providing data 90 to session 55N to satisfy the data access request issued by session 55N.

In this embodiment, circuitry 38, integrated circuit 39, and/or controller 41 may execute the operations described herein as being executed by circuitry 38, integrated circuit 39, and/or controller 41, as a result of the execution by circuitry 38, integrated circuit 39, and/or controller 41 of BIOS instructions 56. Circuitry 38, integrated circuit 39, and/or controller 41 may execute these operations independent of the one or more operating systems 50 and/or the one or more operating systems' instructions executed by processor 12. For example, in order to carry out these operations, circuitry 38, integrated circuit 39, and/or controller 41 do not execute any part of one or more operating systems 50 and/or the one or more operating systems' instructions executed by processor 12. As a result, for example, circuitry 38 and/or controller 41 may be capable of executing operation 204 independent of one or more operating systems 50 and/or the one or more operating systems' instructions executed by processor 12, and circuitry 38 and/or controller 41 may be capable of translating, into one or more corresponding sets and/or ranges of addresses 188 in one or more of the partitions 88, one or more sets and/or ranges of bus addresses 186 to which one or more data access requests issued by one or more of the sessions 55 may be directed.

Thus, a system embodiment may comprise a circuit board. The circuit board may comprise a circuit card slot and a circuit card that is capable of being inserted into the circuit card slot. The circuit card may comprise circuitry capable of partitioning, in response at least in part to a request from a remote authority, at least a portion of storage into partitions. The partitions may be in accordance, at least in part, with partitioning information from the remote authority. The partitioning information may associate sessions with the partitions.

In this system embodiment, the partitioning of the storage, and/or translation of one or more addresses to which data access requests may be directed, may be performed by the circuitry independent of an operating system. Advantageously, the features of this system embodiment may permit this system embodiment to be able to overcome the aforesaid and/or other disadvantages of the aforesaid conventional arrangement.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Additional modifications are also possible. Accordingly, the claims are intended to cover all such equivalents.

What is claimed is:

1. A method comprising:
a host receiving via a network a partition request from a remote authority, the partition request including partition information having a listing of virtual machine sessions of the host and a listing of addresses of storage partitions of the host;
in response at least in part to the partition request from the remote authority, storing at the host a lookup table mapping virtual machine sessions in the listing of virtual machine sessions to respective addresses in the listing of addresses of storage partitions;
executing a plurality of virtual machine sessions of the host, including one of the plurality of virtual machine sessions sending to a storage controller of the host a request to access a virtual storage device, the request including an address of the virtual storage device;
redirecting the sent request to access the virtual storage device from the storage controller to a microcontroller of the host;
the microcontroller determining from the lookup table that a storage partition has been assigned to the one of the plurality of virtual machine sessions, including the microcontroller translating the address of the virtual storage device into a corresponding address of the storage partition assigned to the one of the plurality of virtual machine sessions; and
based on the determining that the storage partition has been assigned to the one of the plurality of virtual machine sessions, the microcontroller signaling the controller to access the storage partition assigned to the one of the plurality of virtual machine sessions.

2. The method of claim 1, wherein:
the partitioning information associates the partitions with addresses of virtual devices.

3. The method of claim 2, wherein:
the addresses comprise bus addresses.

4. The method of claim 2, wherein:
the partitions are identified in the partition information, at least in part, by one or more storage addresses.

5. The method of claim 1, wherein:
the host executing the plurality of virtual machine sessions includes the host executing a virtual machine operating system comprising a virtual machine monitor for the plurality of virtual machine sessions; and
the microcontroller operates independent of the virtual machine operating system.

6. An apparatus comprising:

a storage;

a plurality of virtual machine sessions including a first virtual machine session to send a request to access the storage, the request including an address of a virtual storage device;

a storage controller to control access to the storage, including receiving the request to access the virtual storage device from the first virtual machine and redirecting the received request to access the virtual storage device;

a lookup table to store, in response to a partition request received at the apparatus from a remote authority via a network, partitioning information from the partition request, the partitioning information mapping virtual machine sessions to respective addresses of partitions in the storage; and a microcontroller to receive from the controller the redirected request to access the virtual storage device, the microcontroller further to determine from the lookup table that a storage partition has been assigned to the first virtual machine session, including the microcontroller translating the address of the virtual storage device into a corresponding address of the storage partition assigned to the first virtual machine session, the microcontroller further to signal the controller, in response to the determining that the storage partition has been assigned to the first virtual machine session, to access the storage partition assigned first virtual machine session.

7. The apparatus of claim 6, wherein: the partitioning information associates the partitions with addresses of virtual devices.

8. The apparatus of claim 7, wherein: the addresses comprise bus addresses.

9. The apparatus of claim 7, wherein: the partitions are identified in the partition information, at least in part, by one or more storage addresses.

10. The apparatus of claim 6, further comprising a virtual machine operating system having a virtual machine monitor to monitor the plurality of virtual machine sessions, wherein the microcontroller operates independent of the virtual machine operating system.

* * * * *